(12) United States Patent
Black et al.

(10) Patent No.: US 8,484,907 B2
(45) Date of Patent: Jul. 16, 2013

(54) METHODS AND APPARATUS FOR A BUILDING ROOF STRUCTURE

(75) Inventors: Roy Gary Black, Berkeley, CA (US); Cullen Burda, Berkeley, CA (US)

(73) Assignee: Integrated Structures, Inc., Berkeley, CA (US)

( * ) Notice: Subject to any disclaimer, the term of this patent is extended or adjusted under 35 U.S.C. 154(b) by 623 days.

(21) Appl. No.: 12/590,221

(22) Filed: Nov. 3, 2009

(65) Prior Publication Data

US 2010/0107514 A1    May 6, 2010

Related U.S. Application Data

(60) Provisional application No. 61/198,313, filed on Nov. 4, 2008.

(51) Int. Cl.
| | |
|---|---|
| *E04D 3/36* | (2006.01) |
| *E04H 1/00* | (2006.01) |
| *E04C 2/04* | (2006.01) |
| *E04C 1/00* | (2006.01) |

(52) U.S. Cl.
USPC .......... 52/91.3; 52/79.14; 52/271; 52/309.12; 52/461; 52/602

(58) Field of Classification Search
USPC .............. 52/79.1, 79.14, 90.1, 91.1, 91.2, 52/91.3, 270, 271, 309.11, 309.12, 309.13, 52/309.14, 309.17, 309.7, 309.8, 309.9, 319, 52/320, 321, 322, 323, 325, 328, 330, 335, 52/338, 340, 405.1, 405.2, 432, 459, 460, 52/461, 463, 464, 465, 468, 469, 470, 471, 52/472, 602, 630, 250, 262, 414
See application file for complete search history.

(56) References Cited

U.S. PATENT DOCUMENTS

| | | | | |
|---|---|---|---|---|
| 775,562 | A | * | 11/1904 | Golliek .......................... 52/602 |
| 1,111,131 | A | * | 9/1914 | Broughton ...................... 52/270 |
| 1,484,206 | A | * | 2/1924 | Birkholz ......................... 52/602 |
| 1,539,023 | A | * | 5/1925 | Roberts .......................... 264/31 |
| 1,666,199 | A | * | 4/1928 | Fitzpatrick ..................... 52/571 |
| 1,797,295 | A | * | 3/1931 | Owen ............................. 52/602 |
| 1,821,355 | A | * | 9/1931 | Murray .......................... 52/336 |
| 2,053,873 | A | * | 9/1936 | Niederhofer ................... 52/213 |
| 2,335,948 | A | * | 12/1943 | Leemhuis ....................... 52/281 |
| 3,258,889 | A | * | 7/1966 | Butcher ...................... 52/309.11 |
| 3,298,894 | A | * | 1/1967 | Barnette ......................... 428/68 |
| 3,343,474 | A | * | 9/1967 | Sohda et al. .................. 454/185 |
| 3,475,873 | A | * | 11/1969 | Steadman .................... 52/293.1 |
| 3,898,776 | A | * | 8/1975 | Cox et al. ..................... 52/79.14 |
| 3,930,347 | A | * | 1/1976 | Megumi ...................... 52/220.2 |
| 3,943,676 | A | * | 3/1976 | Ickes ......................... 52/309.12 |
| 4,223,667 | A | * | 9/1980 | Paymal ......................... 126/621 |

(Continued)

FOREIGN PATENT DOCUMENTS

JP    02296948  A  * 12/1990

*Primary Examiner* — Brian Glessner
*Assistant Examiner* — Joseph J Sadlon
(74) *Attorney, Agent, or Firm* — H. Michael Brucker

(57) ABSTRACT

A foam core cement construction panel having shear members and lateral rails that form a channel-beam-like structure and novel methods of using the panels to form an integrated roof structure that serves three separate functions: (1) the roof load structure assembly; (2) the roof's exterior waterproof assembly; and (3) the roof's exposed interior ceiling assembly and which can include internal hydronics for added climate control.

12 Claims, 18 Drawing Sheets

U.S. PATENT DOCUMENTS

| | | | | |
|---|---|---|---|---|
| 4,269,172 A * | 5/1981 | Parker et al. | | 126/621 |
| 4,271,818 A * | 6/1981 | Hastwell | | 126/621 |
| 4,292,783 A * | 10/1981 | Mulvihill | | 52/741.4 |
| 4,309,853 A * | 1/1982 | Lowe | | 52/91.3 |
| 4,342,180 A * | 8/1982 | Gibson et al. | | 52/745.2 |
| 4,365,453 A * | 12/1982 | Lowe | | 52/478 |
| 4,387,544 A * | 6/1983 | Schilger et al. | | 52/405.1 |
| 4,454,702 A * | 6/1984 | Bonilla-Lugo et al. | | 52/745.13 |
| 4,467,859 A * | 8/1984 | Carroll et al. | | 165/57 |
| 4,669,240 A * | 6/1987 | Amormino | | 52/236.6 |
| 4,785,602 A * | 11/1988 | Giurlani | | 52/309.12 |
| 4,942,702 A * | 7/1990 | Lemasson | | 52/127.7 |
| 4,970,838 A * | 11/1990 | Phillips | | 52/250 |
| 5,222,338 A * | 6/1993 | Hull et al. | | 52/405.3 |
| 5,344,700 A * | 9/1994 | McGath et al. | | 428/304.4 |
| 5,381,635 A * | 1/1995 | Sanger | | 52/251 |
| 5,493,838 A * | 2/1996 | Ross | | 52/745.1 |
| 5,588,272 A * | 12/1996 | Haponski | | 52/309.12 |
| 5,746,037 A * | 5/1998 | Nordberg | | 52/405.1 |
| 5,845,441 A * | 12/1998 | Swartz | | 52/250 |
| 5,927,032 A * | 7/1999 | Record | | 52/309.11 |
| 6,000,194 A * | 12/1999 | Nakamura | | 52/783.17 |
| 6,119,417 A * | 9/2000 | Valverde et al. | | 52/223.7 |
| 6,119,422 A * | 9/2000 | Clear et al. | | 52/309.8 |
| 6,519,904 B1 * | 2/2003 | Phillips | | 52/309.12 |
| 6,526,714 B1 * | 3/2003 | Billings et al. | | 52/309.8 |
| 7,017,316 B2 * | 3/2006 | DiLorenzo | | 52/414 |
| 7,051,484 B2 * | 5/2006 | Nanayakkara | | 52/481.1 |
| 7,100,336 B2 * | 9/2006 | Messenger et al. | | 52/309.17 |
| 7,226,033 B2 * | 6/2007 | Foucher et al. | | 249/44 |
| 7,823,352 B2 * | 11/2010 | Fritschi | | 52/405.3 |
| 7,908,807 B2 * | 3/2011 | Geilen | | 52/309.12 |
| 8,082,711 B2 * | 12/2011 | Schiffmann et al. | | 52/293.1 |
| 2003/0029108 A1 * | 2/2003 | Neuhaus et al. | | 52/309.12 |
| 2008/0028719 A1 * | 2/2008 | Rutledge | | 52/690 |

* cited by examiner

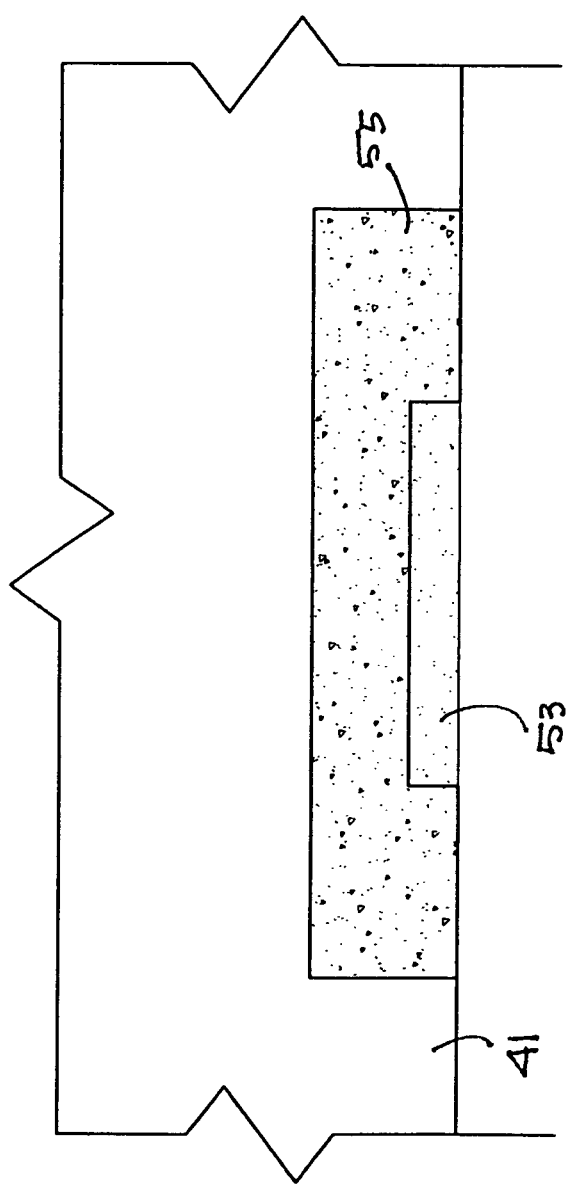

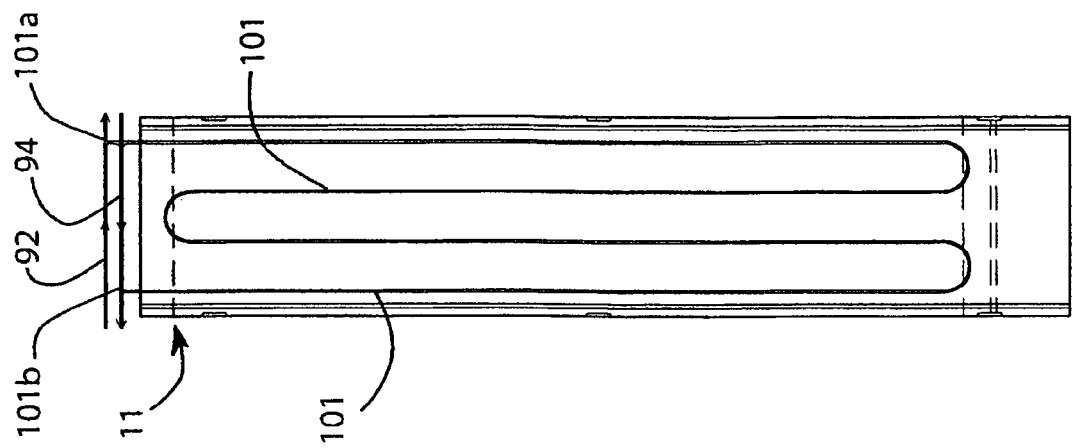
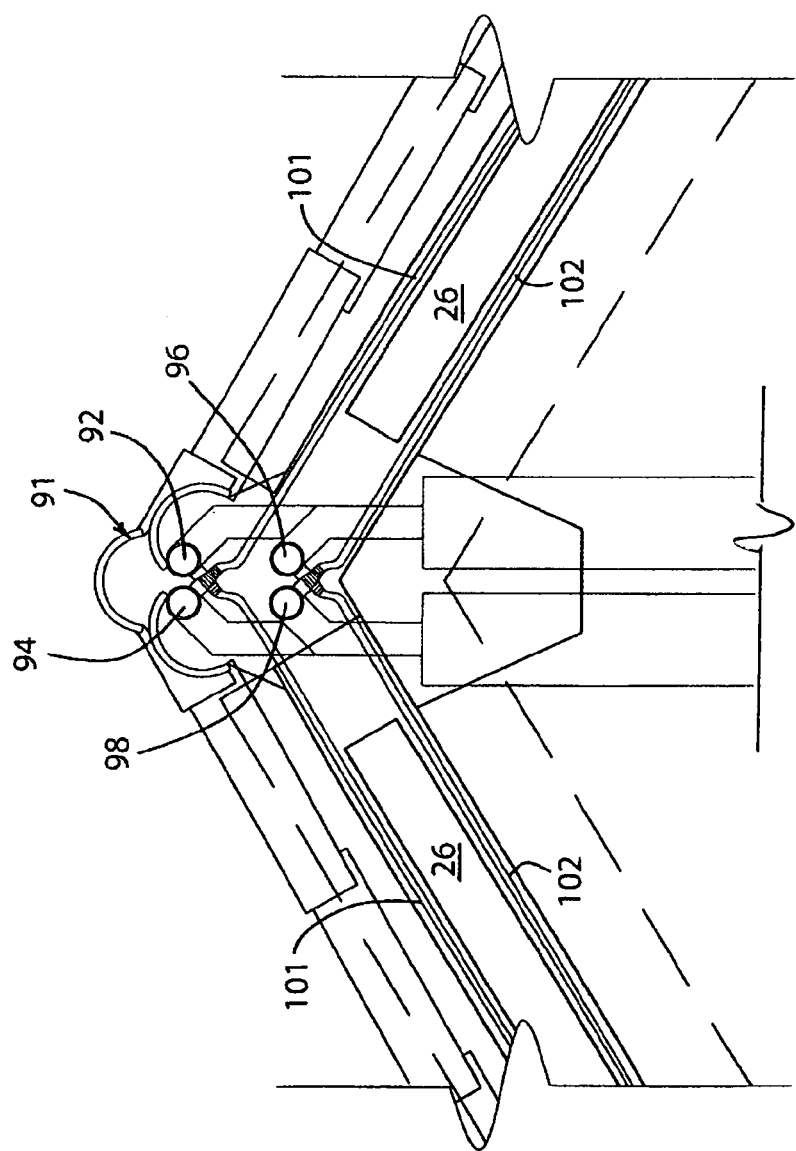

METHODS AND APPARATUS FOR A BUILDING ROOF STRUCTURE

BACKGROUND

The present invention relates to building construction members, with particular emphasis on methods and apparatus for construction of a building roof system and, in particular, to methods and apparatus for constructing a roof system that integrates multiple roof functions into a single roof assembly.

A building roof system typically performs three separate functions through three separate assemblies: (1) the roof load structure assembly which is typically composed of trusses, rafters, or purlins and plywood sheathing; (2) the roofs exterior waterproof assembly which is typically composed of building paper overlaid by tile, composition shingles or metal; and (3) the roofs exposed interior ceiling assembly which is typically composed of drywall, wood, plaster or the like.

The present invention teaches a novel construction panel and a roof system using that panel and methods of constructing such a roof system that performs all three of the aforementioned roof functions by a single integrated roof assembly and, in addition, is capable of integrating and performing the building's heating and cooling functions which are typically provided by a HVAC system or radiant slab.

BRIEF DESCRIPTION OF THE INVENTION

The present invention teaches a novel construction panel having a stress skin concrete structure in which two thin leaves (of the order of 1½") of concrete are cast over a reinforced polystyrene slab. The TRI-D HADRIAN® foam panel is one product that can be used for this purpose. The panel of the invention has the advantageous structural qualities of a channel beam, an upper surface that serves as an all-weather roof covering, a lower surface that serves as an interior ceiling. In one embodiment, the building heating and cooling is provided by embedded hydronic tubing that can, by the circulation of fluids, capture solar heat and use it to provide heating, cooling or both and provide active thermal control by shifting peak demands for energy and reduce energy usage. A typical panel, by way of example only, is 4 feet wide and has an overall thickness of 3" plus the thickness of the polystyrene panel (from 3" to 6"). Each panel can be cast to a length up to about 40 feet. These novel construction panels are assembled together by a novel method that creates a single roof diaphragm that is weatherproof, thermally efficient, and able to span significant distances without intermediate support.

BRIEF DESCRIPTION OF THE DRAWINGS

FIG. 8 is a sectional view taken along the line 8-8 of FIG. 7;

FIG. 18 is a semi-schematic side view of a hydronic system added to the construction panels of the invention; and FIG. 19 is a schematic plan view of a hydronic system added to a construction panel of the invention.

DETAILED DESCRIPTION OF THE INVENTION

Figure 1:
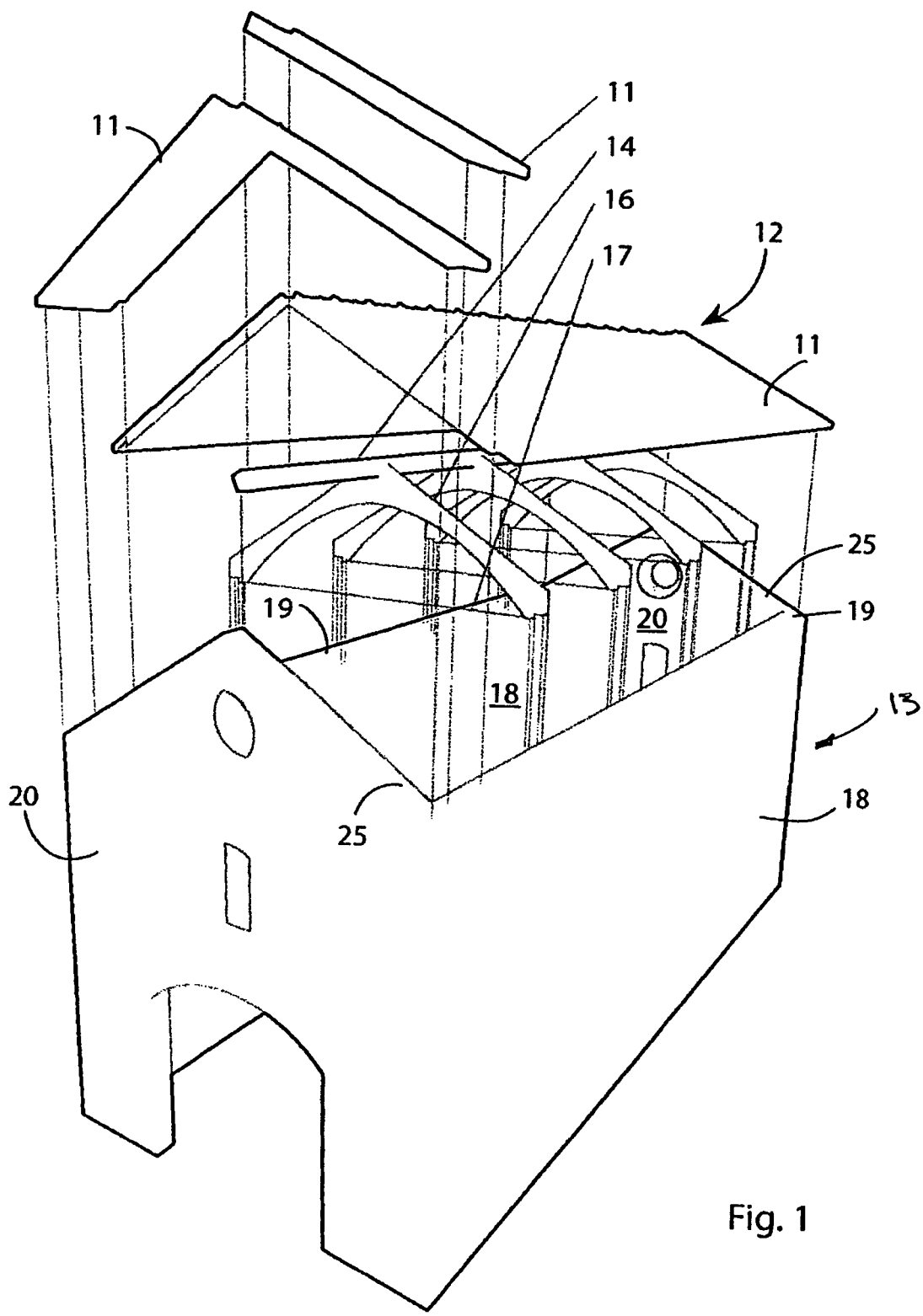
FIG. 1 is a partially exploded isometric view showing a building with a roof system of the present invention.
Figure 2:
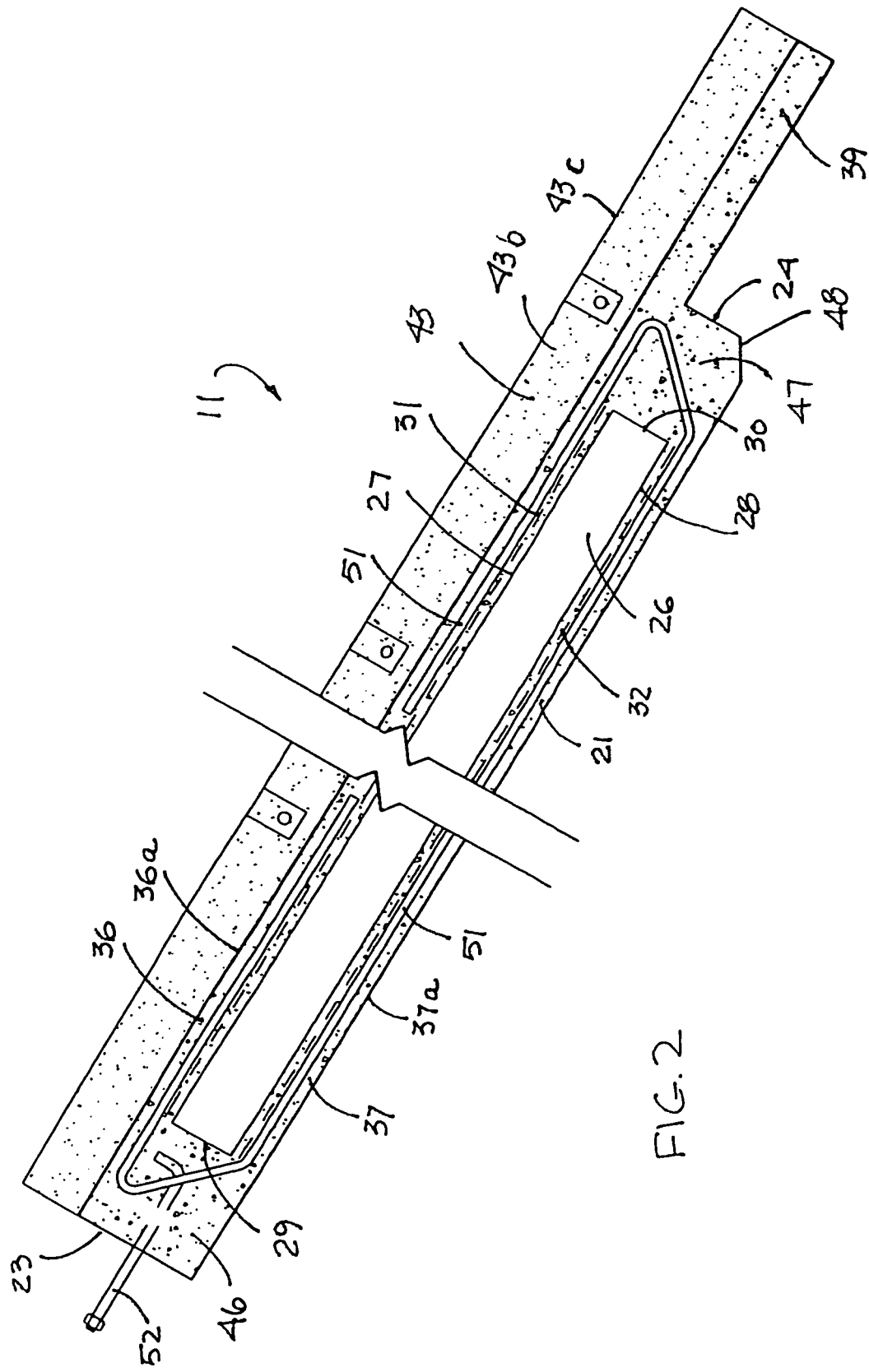
FIG. 2 is a side sectional view of a construction panel of the present invention taken along the line 2-2 of FIG. 4.
Figure 3:
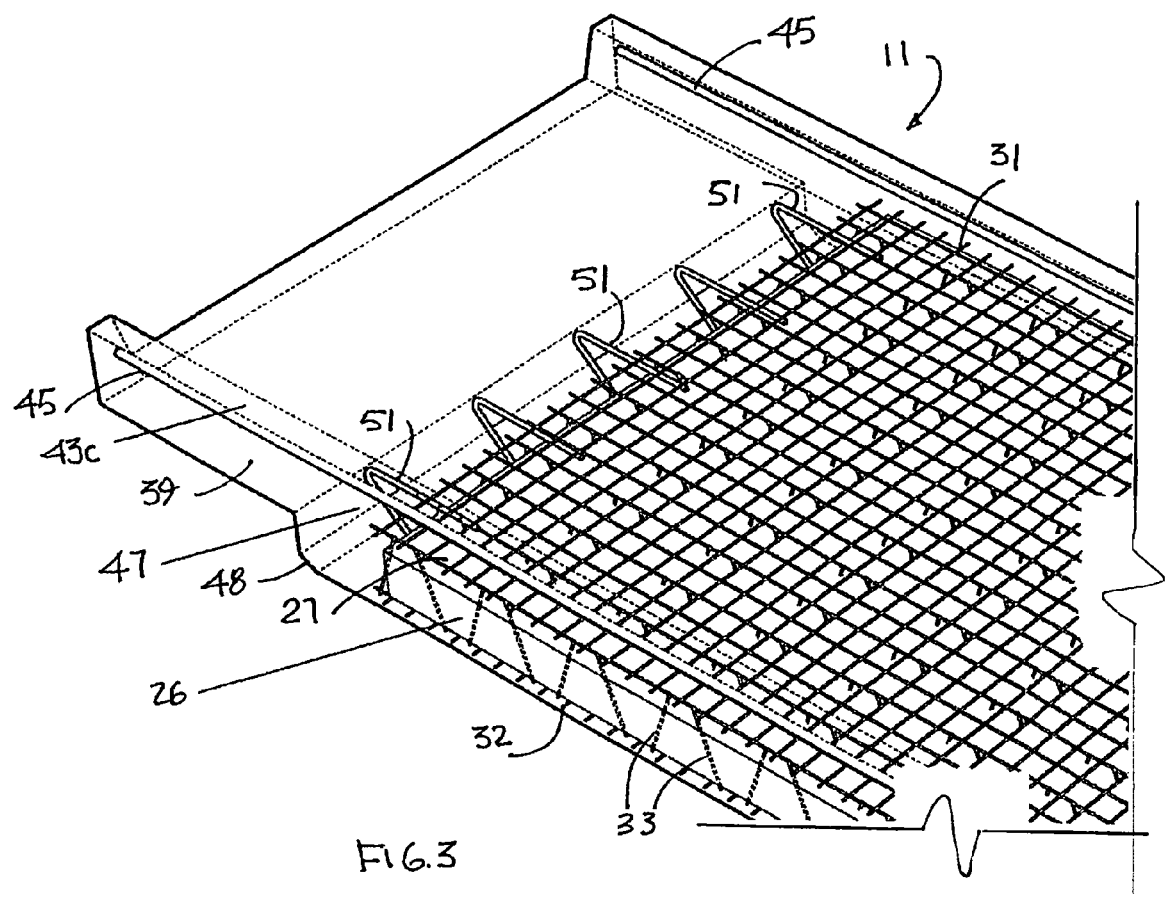
FIG. 3 is a top left isometric view of one end section of the construction panel of the invention revealing internal metal reinforcing members.
Figure 4:
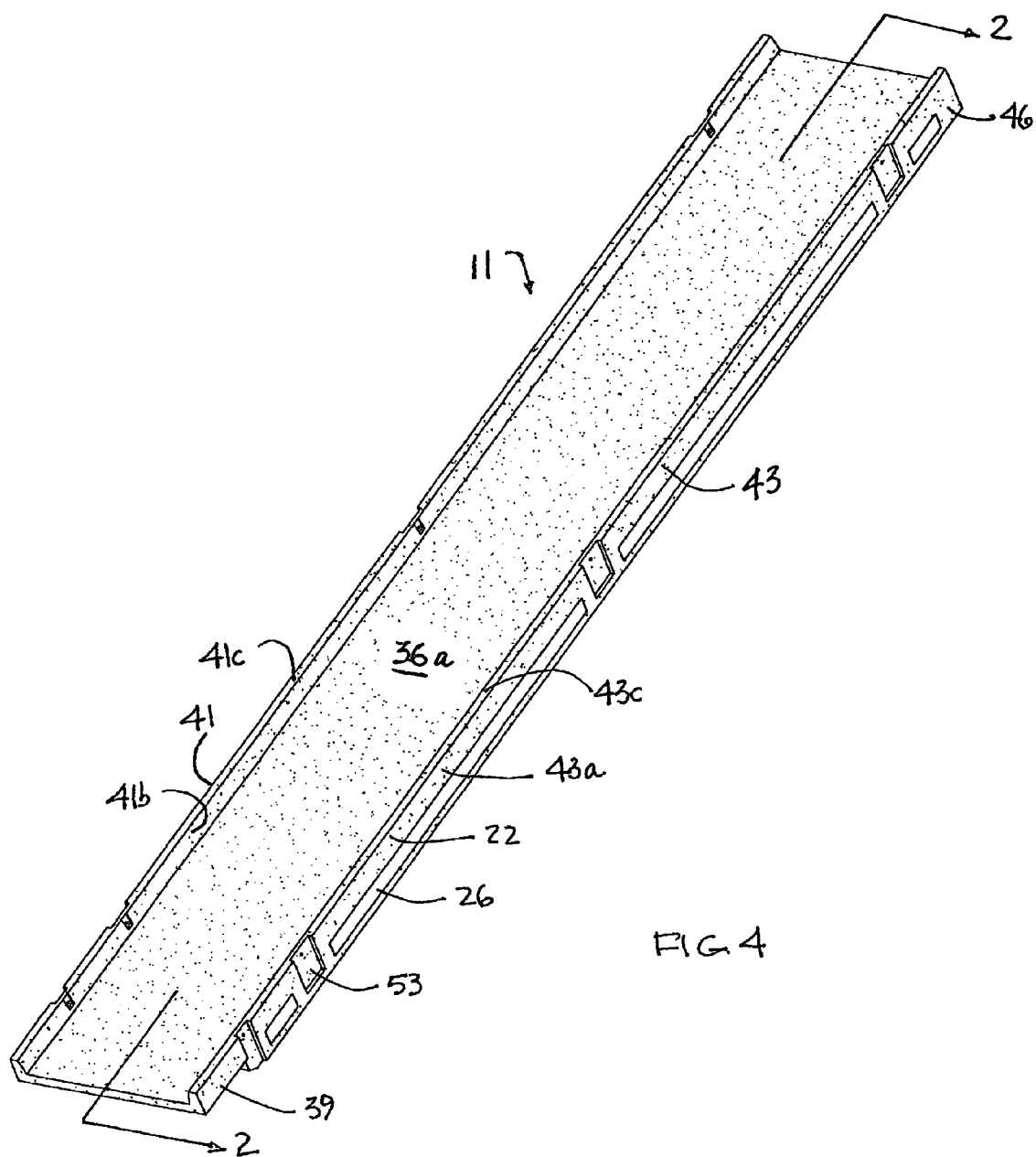
FIG. 4 is a top right isometric view of the construction panel of the invention.

Referring to FIG. 1, a plurality of construction panels 11, according to the present invention, are assembled together, as described in detail below, to form a continuous diaphragm, seismic-resistant roof structure 12 for a building 13 having generally parallel, spaced-apart walls 18 capped by bond beams 19 and end walls 20 capped by rake beams 25. The roof structure 12 is capable of performing all of the functions of: (1) the roof load structure assembly which is typically composed of trusses, rafters, or purlins and plywood sheathing; (2) the roof's exterior waterproof assembly which is typically composed of building paper overlaid by tile, composition shingles or metal; and (3) the roof's exposed interior ceiling assembly which is typically composed of sheetrock, wood or plaster. The present invention is also capable of providing the heating and cooling system needs.

A ridge beam 14, trusses 16 and truss ties 17, typically essential components of a roof structure, are, in the present invention, shoring for the assembly of the roof structure 12 of the present invention and can either be removed after assembly or left in place as redundant structure.

Referring to FIGS. 2-6, a generally rectangular construction panel 11 of the present invention has lateral panel edges 21 and 22, panel end edges 23 and 24, a generally rectangular foam (styrene) slab 26 having a slab upper surface 27, a slab lower surface 28, a slab end edge 29, and a slab end edge 30 is disposed between the panel end edges 23 and 24 and panel side edges 21 and 22. The foam slab 26 has a mesh frame 31 overlaying the slab upper surface 27 and a mesh frame 32 overlaying the lower surface 28. The mesh frames 31 and 32 are advantageously connected by diagonal truss wires 33.

A concrete panel bed 36 having an exterior exposed panel bed surface 36a is formed over and covers the upper surface 27 of slab 26 and includes mesh frame 31. A concrete panel floor 37 having an exterior exposed panel floor surface 37a is formed over and covers the lower surface 28 of slab 26, including mesh frame 32. The panel bed 36 extends beyond end edge 24, creating a cantilever section 39.

The panel bed 36 and its exposed surface 36a are, in the constructed roof 12 of the present invention, both a component in the roof structure and the weather surface, requiring no additional weatherproofing materials. In this regard, the concrete used to form bed 36 and all other concrete elements of the roof structure 12 exposed to weather can advantageously include any of several known waterproofing ingredients such as Xypex®.

Figure 5:
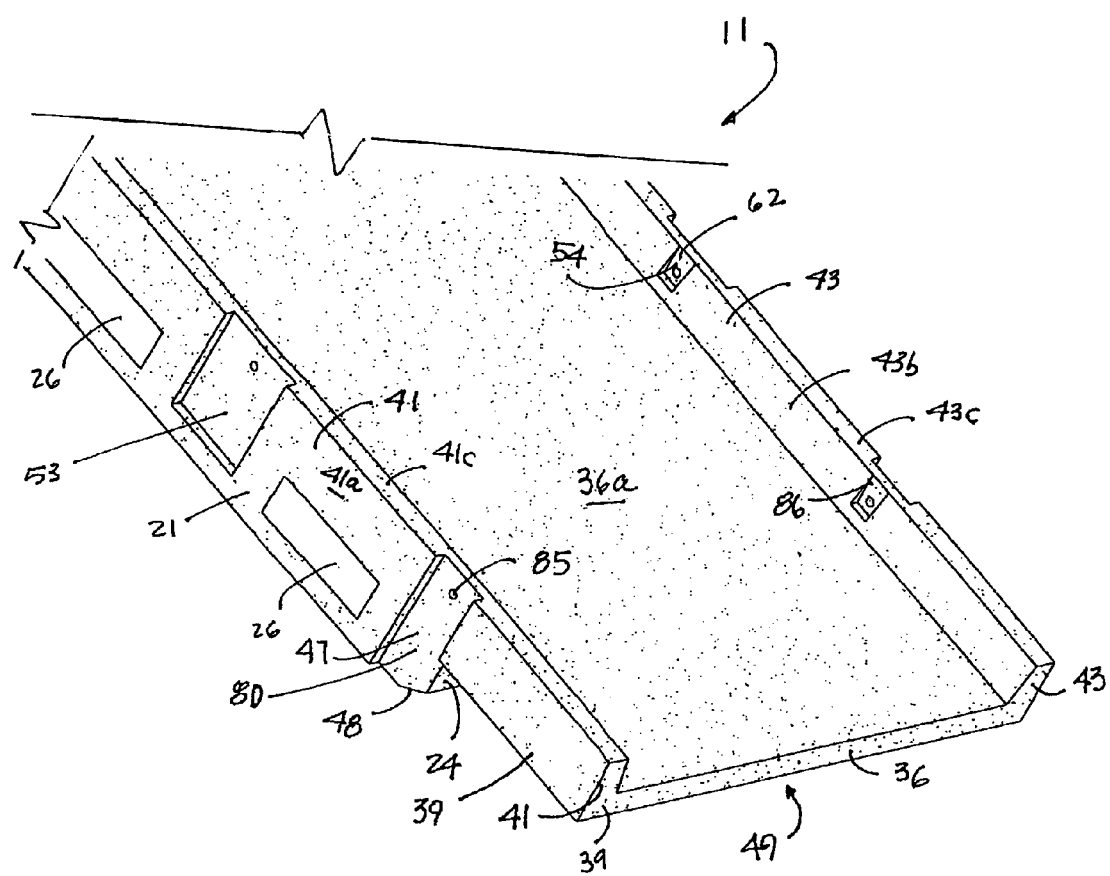
FIG. 5 is a top left isometric view of one end of the construction panel of the invention.

A first upstanding concrete rail 41 extends along panel lateral edge 21 and above panel bed 36 and has an exterior sidewall surface 41a, a slightly canted interior sidewall surface 41b, and a top surface 41c. A second concrete rail 43 generally parallel to rail 41 extends along panel lateral edge 22 and above panel bed 36 and has an exterior sidewall surface 43a, a slightly canted interior sidewall surface 43b, and a top surface 43c. Together, the rails 41 and 43 and panel bed 36 form a shallow U-shape indicated at 49 (FIG. 5). The rails 41 and 43 extend the full length of lateral edges 21 and 22, including the cantilever section 39, and include steel reinforcing 45 (FIG. 3) in a manner well known to those skilled in the art of reinforcing concrete structures.

A first concrete shear member 46 extends between and secures together panel bed 36 and panel floor 37 from lateral edge 21 to lateral edge 22 adjacent slab end edge 29 and defines end edges 23. A second concrete shear member 47 extends between and secures together panel bed 36 and panel floor 37 from lateral edge 21 to lateral edge 22 adjacent slab end edge 30 and defines end edges 24. The shear member 47 also includes a support surface 48 (the function of which is described below) between end edge 24 and panel floor surface 37a that is at an obtuse angle to both.

The shear members 46 and 47 connect panel bed 36 and panel floor 37 and carry the full shear demand on the construction panel 11 and bear the weight of the panel at the ridge beam 14 and at the walls 18 (see FIG. 1). The panels are installed so that they span the entire distance from the bond beams 19 of walls 18 to the ridge beam 14 (which can be 40 feet or more). The strength of the panel 11 is all the greater by virtue of the rails 41 and 43 which with the panel bed 36, shear members 46 and 47, and panel floor 37 form a channel structure with the enhanced load-bearing characteristics of such structures.

To further reinforce the panel 11 at shear members 46 and 47, a plurality of reinforcing rods 51 are cast into the panel 11 at spaced-apart locations between lateral panel edges 21 and 22 so as to be disposed within the panel floor 37, shear members 46 and 47, and panel bed 36. For reasons that are explained below, an anchor bolt 52 is cast into shear member 46 from which it protrudes.

In one embodiment of the invention all of the concrete members (panel bed 36, panel floor 37, rails 41 and 43 and shear members 46 and 47) are one integral reinforced (typically with rebar) concrete structure created in a form in a manner known to those skilled in the art.

As best seen in FIGS. 4-8, a plurality of concrete-framed shear key recesses 53 are formed at set spaced-apart locations in the exterior sidewall surfaces 41a and 43a of rails 41 and 43, respectively. The shear key recesses 53 in rail 41 (which is representative of all of the recesses 53) extends from rail top surface 41c to the foam slab upper surface 27 which includes all of the panel bed 36. In forming the recess 53, a portion of the foam slab 26 and its mesh frames 31 and 32 surrounding the recess are cut back and replaced by a concrete frame 55 that surrounds the recess 53. Each shear key recess 53 is advantageously rectilinear and preferably a generally rectangular parallelepiped.

A fastener aperture 54 at each recess extends through the rail into a fastener recess 62 in the opposing interior surface of the rail, permitting a fastener such as a bolt to extend through the rail at the location of the recess 53. Fastener recesses 62, which are situated entirely within the interior surface of the rail above the panel bed 36, receive a bolt head or nut or other fastener component that may be used. The aperture 54 may be formed by a length of tubing 54a that remains in place as an aperture lining.

As best seen in FIGS. 9A, 9B, 9C and 10, when two construction panels 11 are assembled side-by-side with their respective recesses 53 aligned, a shear key pocket 56 is formed. A fastener, such as bolt 57 in fastener apertures 54 secured by nut 58 in fastener recess 62, secures the two rails together. The shear key pocket 56 is filled with grout, forming a shear key 61. The shear key 61 is formed in both rails 41 and 43 of the two adjacent panels from their top surfaces 41c and 43c to the lower surface 27 of foam slab 26, including the panel bed 36. The shear keys 61 so formed resist shear forces between construction panels 11 and interlock the individual panels 11 together, creating a diaphragm that distributes wind and seismic loads to the walls 18 (FIG. 1).

The tops 41c and 43c of the joined rails 41 and 43 are covered with either a Spanish cap tile (not shown) or metal flashing 89 (or any other suitable sealing materials) to waterproof the seams between the rails, thus making the overall roof system waterproof. An important feature of the roof structure 12 is that the panels 11 are both the structure and the waterproofing system. Thus, in addition to the structures for sealing the seams between the panels 11, as described above, the panels 11 are cast with an integral waterproofing compound (such as Xypex®).

A plurality of roof panels 11 are assembled together according to the methods of the present invention to create the novel roof structure 12 of the invention.

Figure 11A:
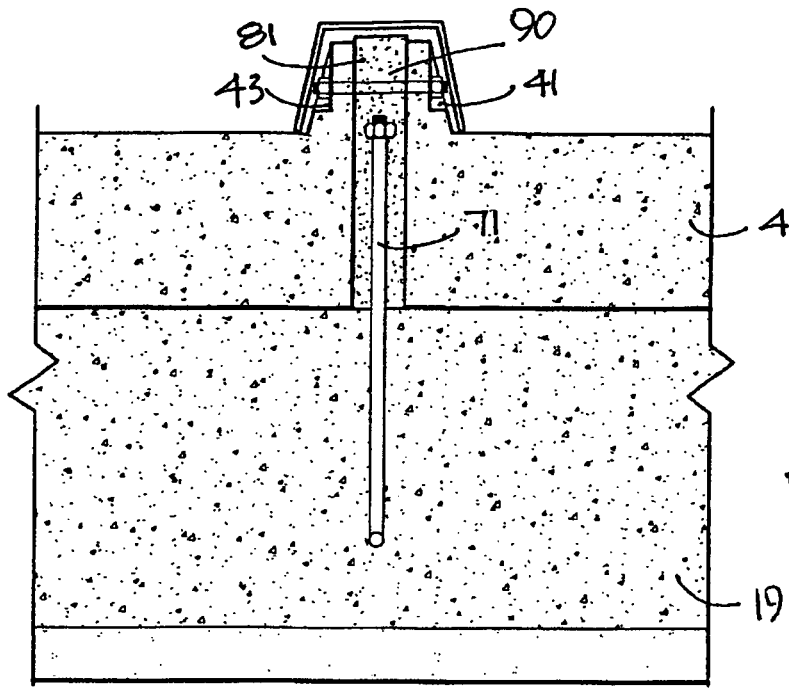
FIG. 11A is a sectional view taken along the line 11A-11A of FIG. 11B.
Figure 11B:
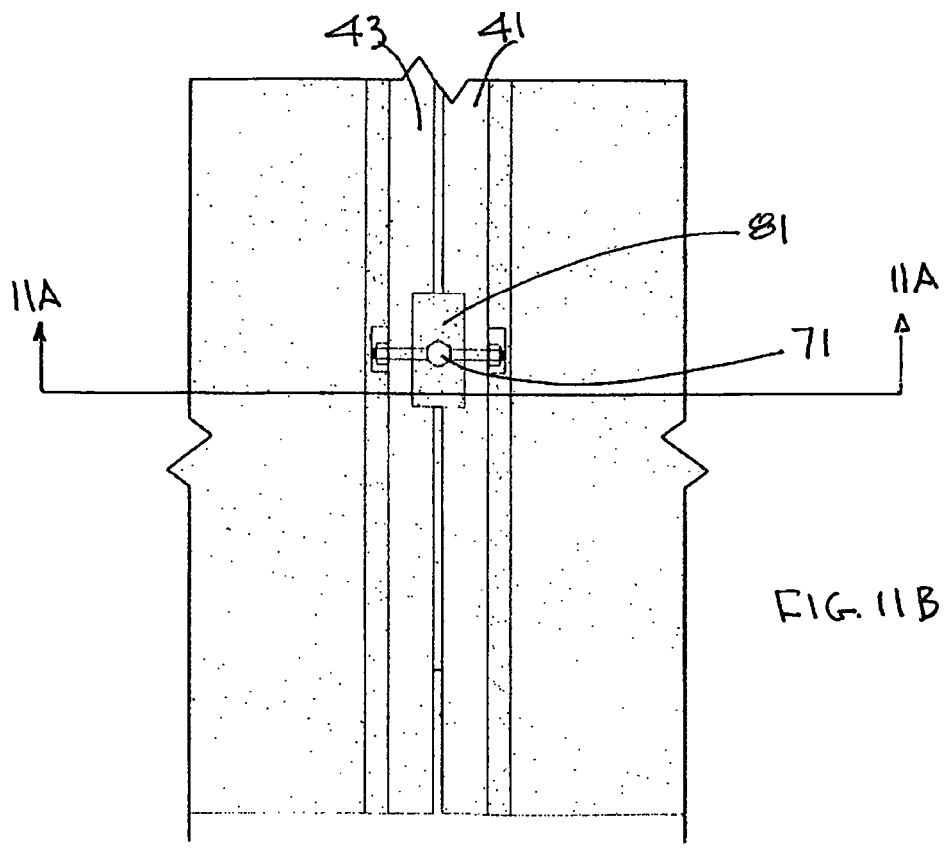
FIG. 11B is a partial plan view of two adjacent anchor bolt cutouts forming an anchor bolt channel at a bond beam.
Figure 12:
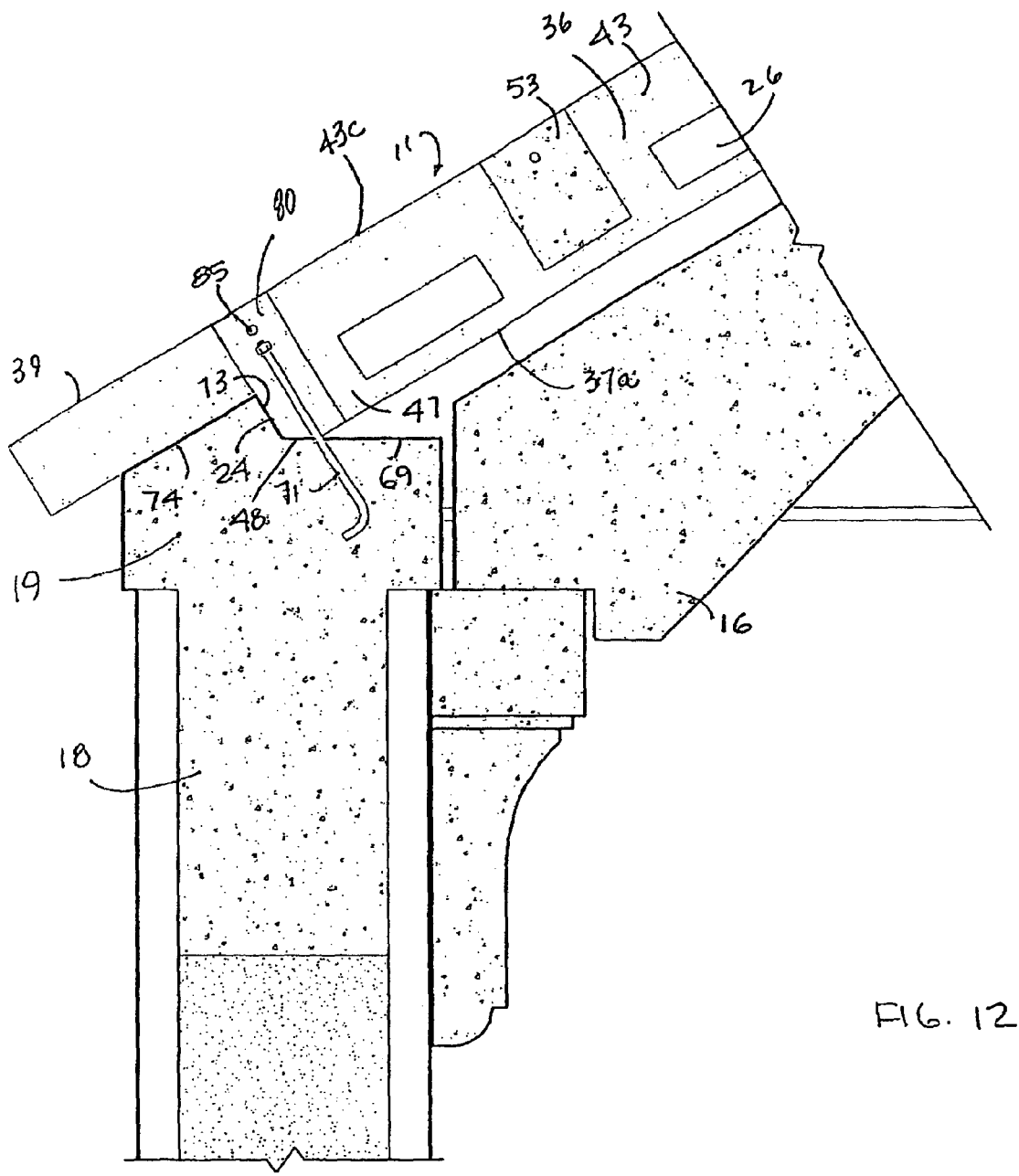
FIG. 12 is a partial side elevation view illustrating the junction of a construction panel of the invention and a bond beam (which is in section)

Referring to FIGS. 5, 11, and 12, as is typical in building construction, the building side walls 18 are topped by a bond beam 19. For the purposes of the present invention, the top of the bond beam 19 has a generally horizontal surface 69, an abutment surface 73 and a cantilever overhang surface 74. The abutment surface 73 is advantageously at a right angle to the angle of the panel 11, although other angles could also provide the support required. The cantilever overhang surface 74 is generally parallel to the roof panels 11.

In assembling the roof structure 12, the end edge 24 of each panel 11 is placed in engagement with, and is supported by, abutment surface 73. The cantilever section 39 of panel bed 36 is located over the overhang surface 74 of bond beam 19, and the shear member support surface 48 of shear member 47 rests on, and is supported by, bond beam surface 69.

In addition to the recesses 53 in rails 41 and 43, each rail includes an open ended anchor bolt cutout 80 (see FIG. 5) that extends from the top surface 43c of rail 43 (41c in the case of rail 41) all the way to the panel floor surface 37a and from the end edge 24 a distance sufficient to receive an anchor bolt 71 (FIG. 11B). Cutouts 80 have a through aperture 85 and an interior fastener recess 86. When two rails 41 and 43 are placed side-by-side (FIG. 11B), the aligned anchor bolt cutouts 80 form an anchor bolt channel 81 that surrounds anchor bolt 71 embedded in the bond beam 19. Anchor bolts 71 can be pre-cast into the bond beam 19 at specified locations along its length and captured within the anchor bolt channel 81 as the panels are mounted on the bond beam. Alternatively, the anchor bolts can be drilled into the bond beam as the panels are mounted.

In either case, once the panels are in place and the anchor bolts 71 in anchor bolt channels 81, channels 81 are filled with grout 90 (FIG. 11B) (the lower open bottom space being temporarily blocked), providing a secure connection between the panel 11 and the bond beam 19.

It will occur to those skilled in the art that geometries other than those described herein could also provide the necessary support functions. What is required is that the wall 18 and bond beam 19 support the loads of the panels 11 and resist movement of the panels 11 in both their longitudinal and lateral directions.

Figure 13:
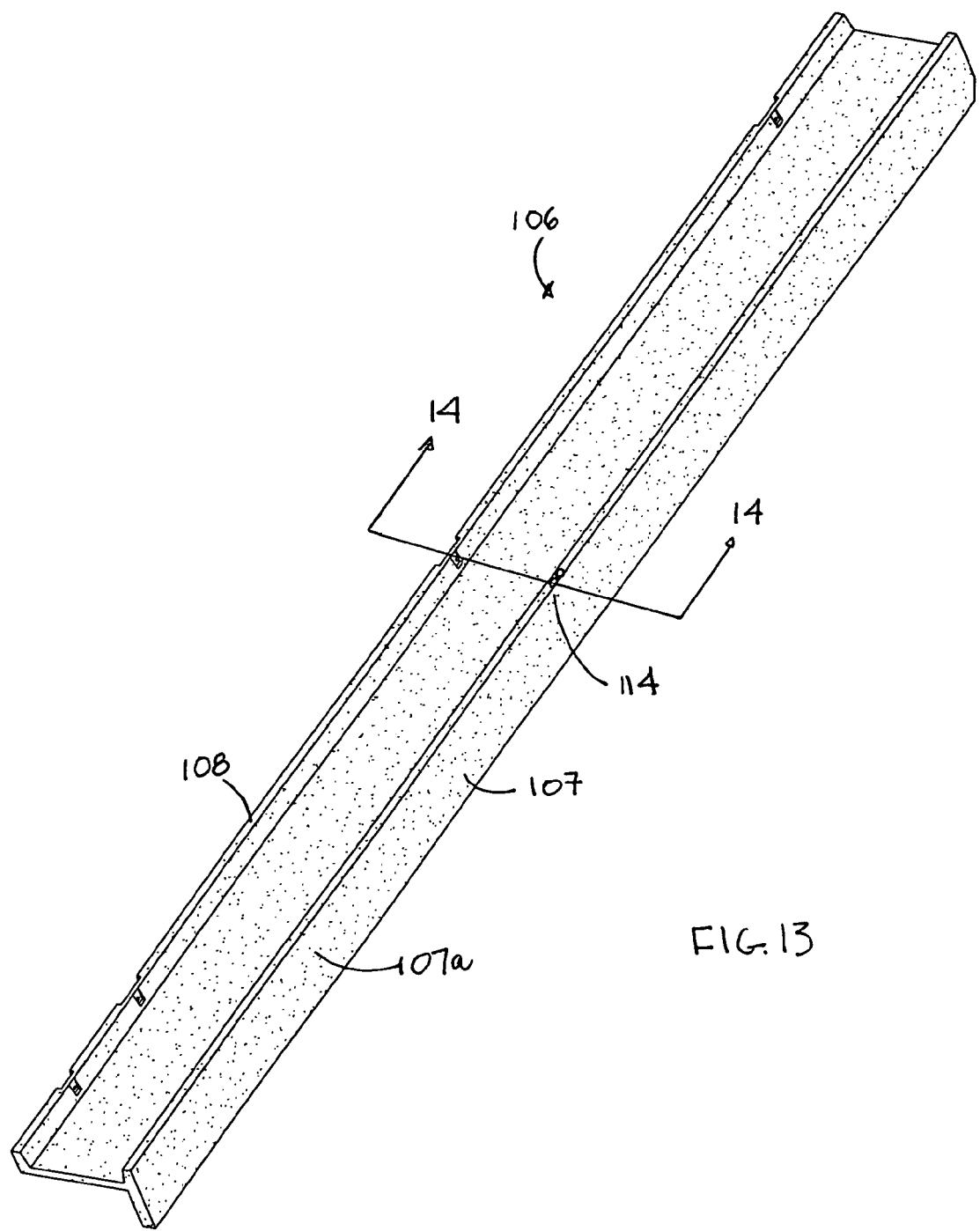
FIG. 13 is a top right isometric view of a construction panel of the invention configured to attach to the rake bond beam.
Figure 14:
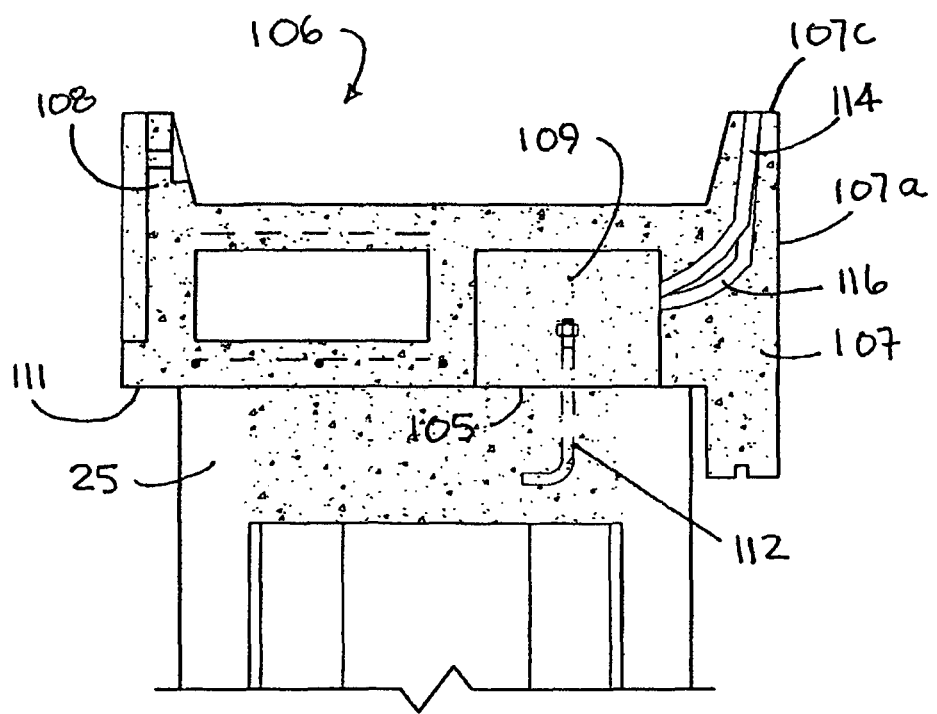
FIG. 14 is a sectional view taken along the line 14-14 of FIG. 13.

Referring to FIGS. 1, 13 and 14, while all of the panels 11 that are only between the ridge 14 and the bond beam 19 and do not engage the rake beam 25 are substantially the same, a special rake panel 106 is provided at, and secured to, the rake beam 25. Rake panel 106 has all of the same structure as panel 11 except for the substitution of rail 43 with a rake panel rail 107. Because rake panel rail 107 does not abut another panel, as do all interior panels 11, its exterior surface 107a has no recesses (such as recesses 53) or cutouts (such as panel cutouts 80), although the opposing rail 108 has all of those features, as well as all others described in connection with rail 41. In order to secure panel 106 to the rake beam 25, concrete framed anchor bolt cups 109 are formed at spaced-apart locations along edge 104 of panel 106 adjacent rail 107. The open end 105 of cups 109 are at the panel floor surface 111.

Anchor bolts 112 are cast into rake beam 25 at locations that match the locations of cups 109 such that when panel 106 is mounted on the bond beam 19, ridge beam 14 and rake beam 25, an anchor bolt 112 is located within a cup 109. To firmly secure the anchor bolts to the panel 106, the cup is filled with grout. This is accomplished by inserting the grout into a fill tube 114 that extends from the rail top surface 107c into cup 109. An air release tube 116 follows a parallel path to that of tube 114 and provides an escape for replaced air.

It will be obvious to those skilled in the art that the rake panel 106 at one rake will have the special rake rail 107 on the side opposite to the side of the rake panel at the other rake.

Figure 15:
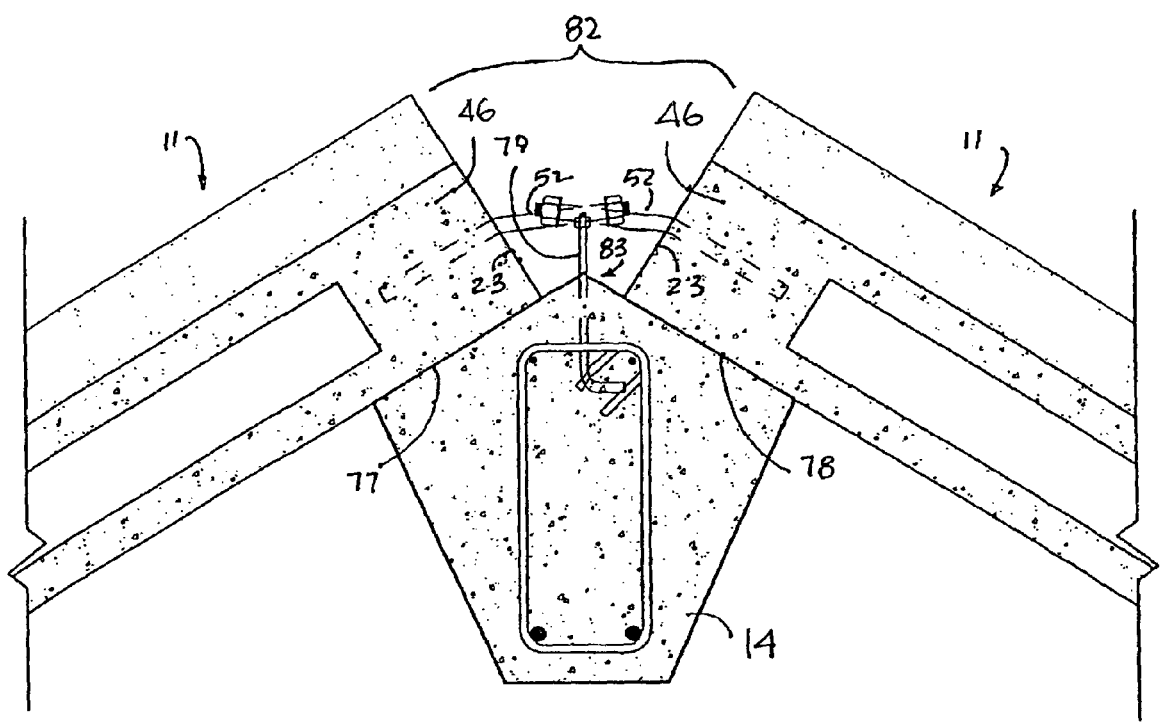
FIG. 15 is a partial side view of two construction panels of the invention at the ridge beam (shown in cross-section)
Figure 16:
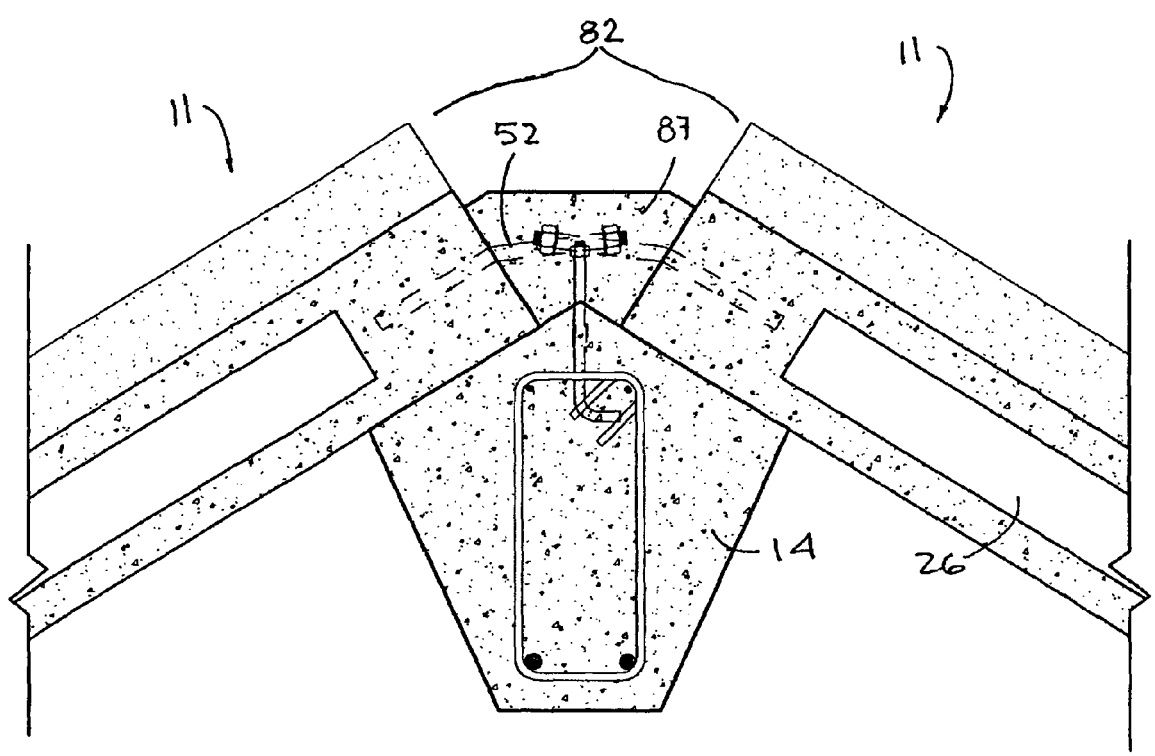
FIG. 16 is the same as FIG. 15 with a channel keystone added (shown in section)
Figure 17:
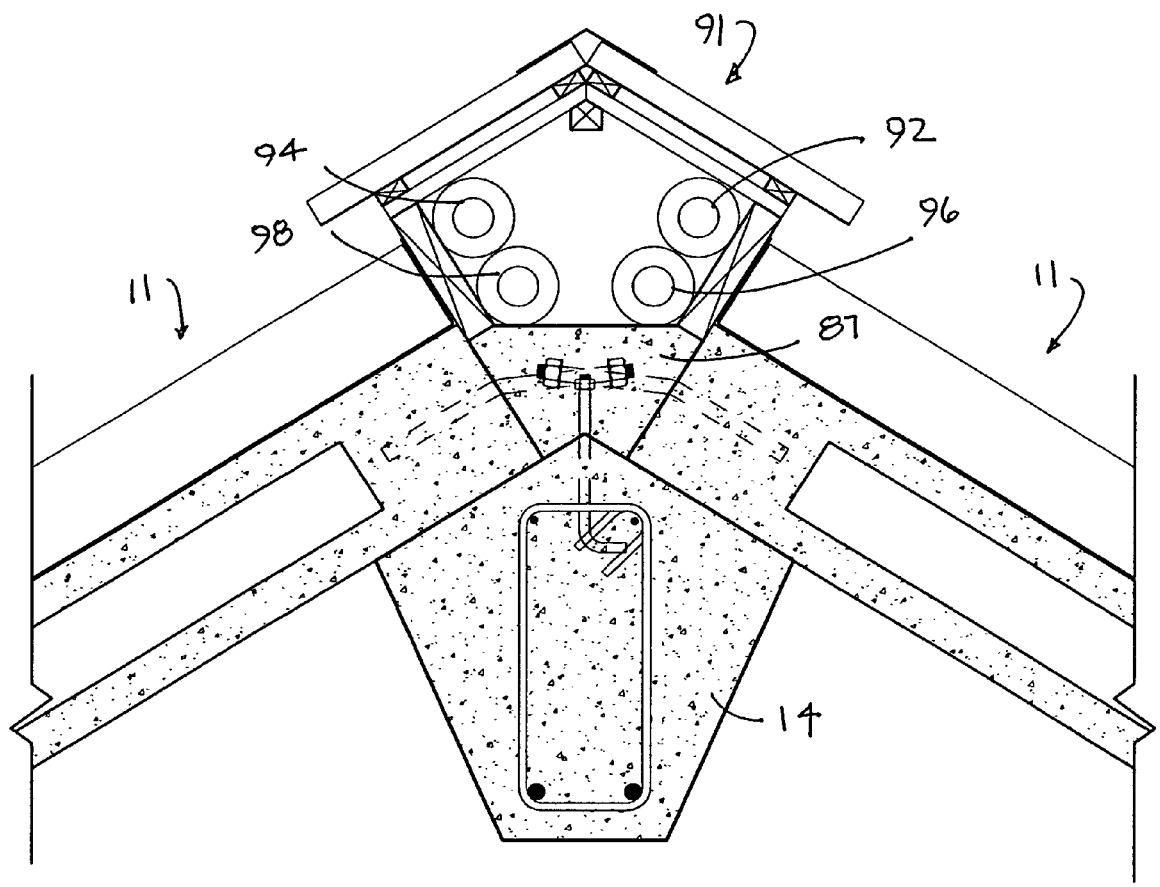
FIG. 17 is the same as FIG. 16 with a superstructure added.

Referring to FIGS. 15, 16 and 17, the ridge beam 14 (see also FIG. 1), which can advantageously (but not necessarily) be of reinforced concrete, has upper support surfaces 77 and 78 angled to match the angle of the roof structure 12. A plurality of ridge beam anchor bolts 79 are cast into the ridge beam 14 at spaced-apart locations along its length.

In assembling the roof structure 12, panels 11 are placed side-by-side all along the ridge beam 14 on both sides of the ridge, with the shear member 46 of each panel 11 supported on one of the support surfaces 77 or 78 (the other end of each panel 11 is supported by the bond beam 67 as described above). This placement of the panels 11 creates a ridge beam channel 82 all along the ridge. The channel 82 has a channel floor 83 (portions of the ridge beam 14 support surfaces 77 and 78) and channel side walls formed by panel end edges 23 into which the shear member anchor bolts 52 and ridge beam anchor bolts 79 extend.

The ridge beam 14 used for the shoring is pre-cast so there is no structural connection holding one section of the ridge beam 14 to another section across the truss 16. There is also nothing connecting the panels 11 on one side of the roof to panels 11 across the ridge on the other side.

To establish these necessary connections, the ridge beam channel 83 is filled with concrete to at least the level necessary to contain the anchor bolts 71 and 52. A channel keystone 87 that supports the load of the panels 11 is thus created. The keystone 87 with the anchor bolts 52 and 79 secured within it connects all of the panels together at their end edges 23, and a continuous tie (by virtue of the concrete and anchor bolts 52) is created running the full length of the ridge. The channel keystone 87 insures that there is a continuous boundary element where the panels 11 face each other running the full length of the roof and that each panel 11 is connected to its opposing neighbor on the other side of the channel keystone 87. It is this arrangement that allows the roof panels 11 to resist deformation by thrusting against each other and the walls 18 at bond beams 19.

When the keystone 87 is in place, the ridge beam 14, which served as shoring for the panels 11 during construction, can be removed as a redundant support structure. The ridge beam anchor bolts 79 are provided only if the ridge beam 14 is to be left in place to prevent the ridge beam or sections of it from falling in a seismic event.

A superstructure 91 (FIG. 17) is constructed onto and above the channel keystone 87 to house hydronic supply conduits 92 and 94 and hydronic return conduits 96 and 98, as well as any other systems that might be advantageously located at the roof peak. The superstructure 91 can take several forms and be constructed of wood, tiles, metal or any other material capable of providing the necessary structural and weather-resistant characteristics.

In one embodiment of the invention, a hydronic system is incorporated to provide improved thermal performance. This hydronic system enhances the temperature control of the basic system substantially by using the solar gathering aspects of the concrete slabs to cool and heat the building's interior using a miniscule amount of electrical energy to drive a small in-line recirculating pump (not shown).

Figure 6:
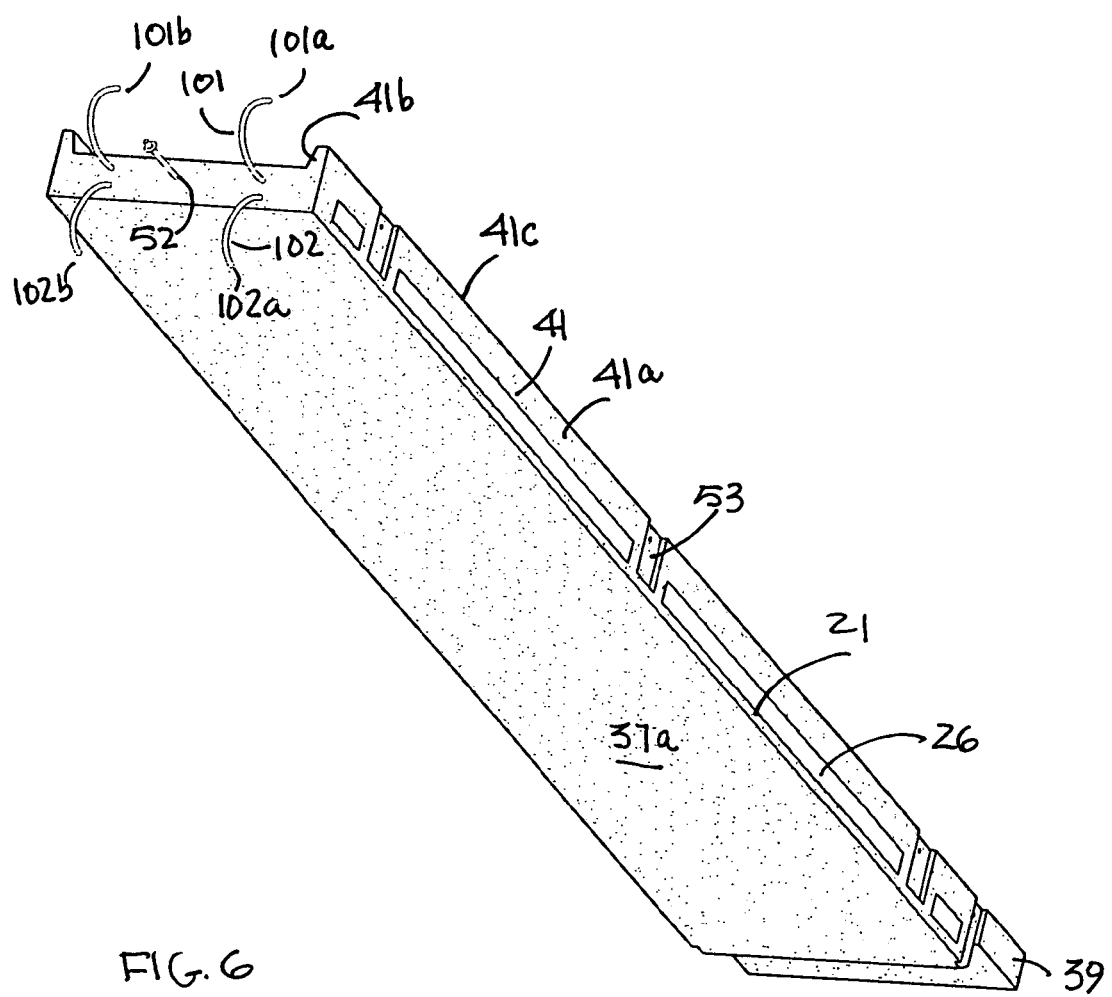
FIG. 6 is a bottom right isometric view of the construction panel of the invention.
Figure 7:
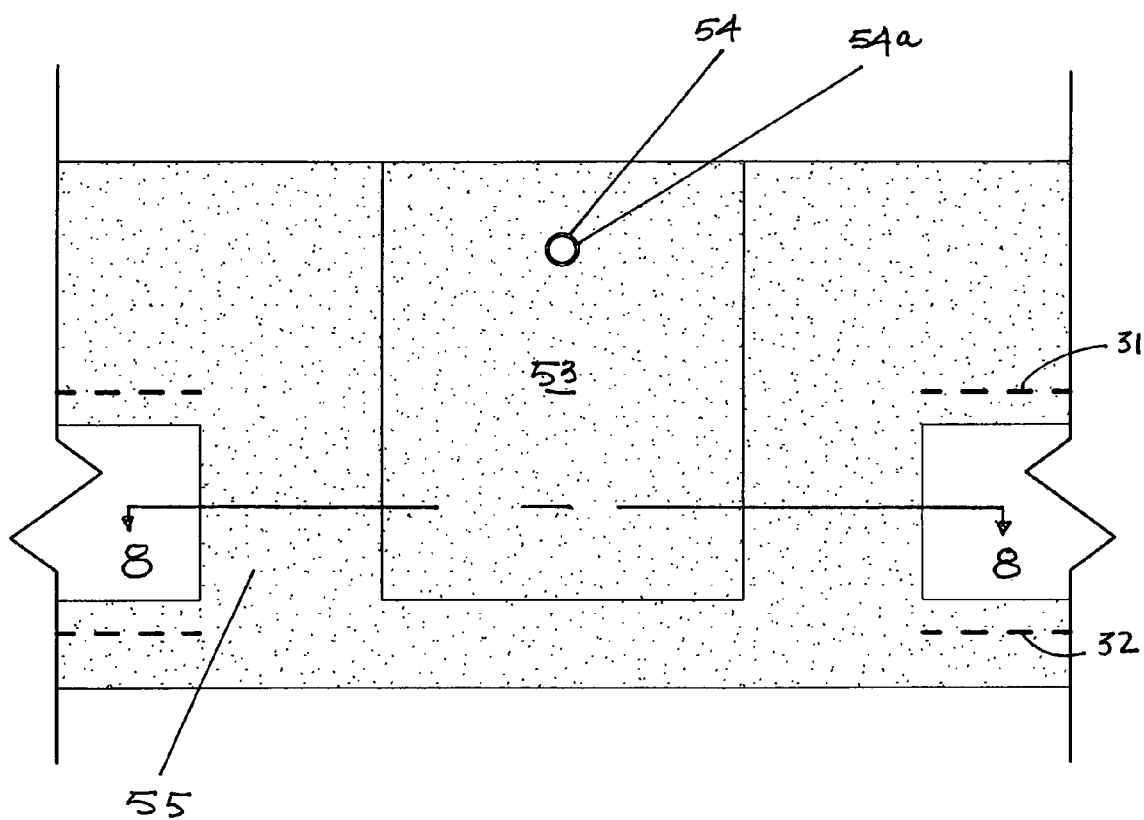
FIG. 7 is a partial side elevation of a rail of the construction panel of the invention showing a shear key recess.
Figure 9A:
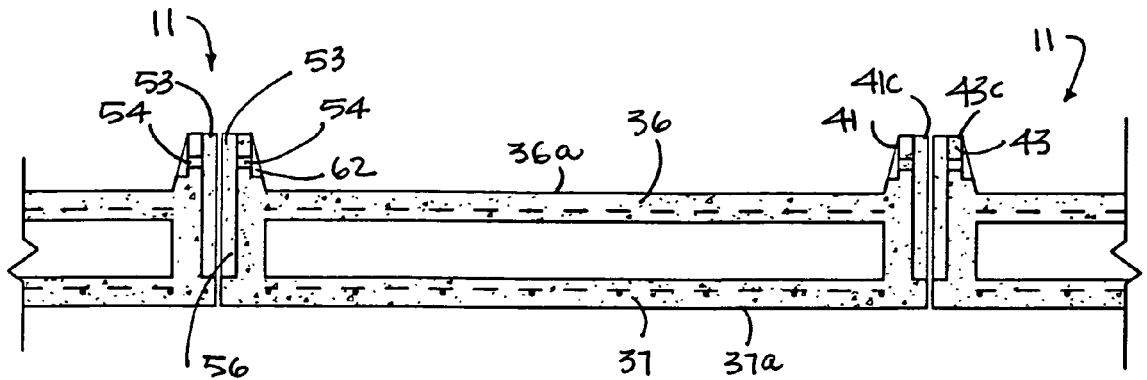
FIG. 9A is sectional view taken along the line 9-9 of FIG. 10 before a bolt and grout are added.
Figure 9B:
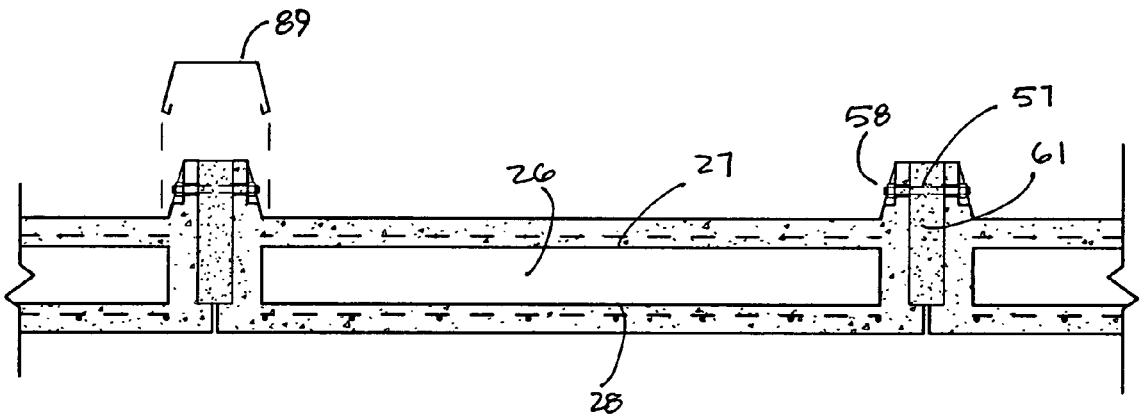
FIG. 9B is the same as 9A illustrating the addition of a fastener and grout and an exploded view of a weather cap.
Figure 9C:
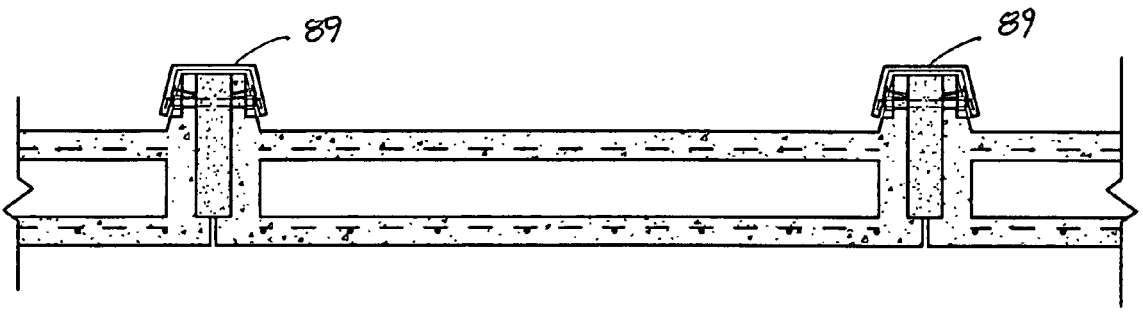
FIG. 9C is the same as 9B with the weather cap in place.
Figure 10:
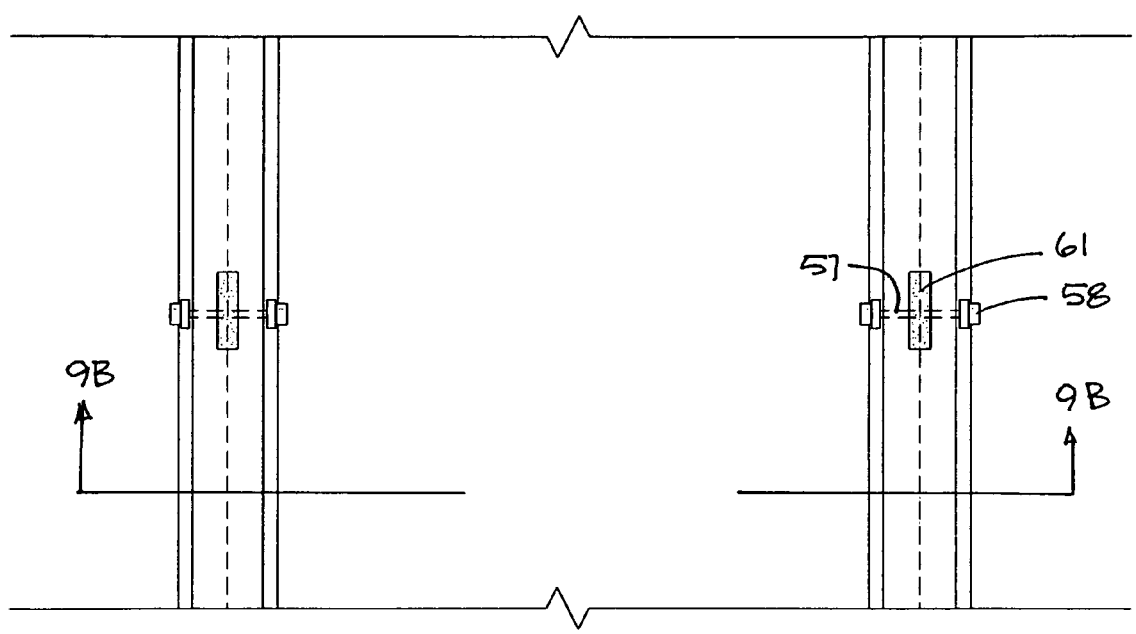
FIG. 10 is a partial top plan view illustrating the junction between side-by-side construction panels of the invention.

Referring to FIGS. 6, 18 and 19, in one embodiment of the invention, two layers of hydronic tubing are cast into the panels 11 with their ends extending out of the panels for connection to common supply and return conduits. A particular material suitable for the tubing is polyethylene and, preferably, each layer is a single piece of tubing without any joints other than end connections.

One layer of tubing 101 is disposed on the side of the foam slab 26 nearest the panel bed 36 (roof side). Preferably, the tubing is disposed in contact with the panel bed 36 such as in the upper surface 27 of the foam slabs 26 between the foam and the covering mesh frames 31. Each tube 101 has its supply end 101a connected to a common supply conduit 92 and its other end 101b connected to the common return conduit 94. Water or other cooling medium is supplied through common supply conduit 92 to the supply end 101a. The fluid flows through the panels 11, making at least two passes (four passes are illustrated) along the panel length (the number of passes depends on the particular configuration of the tubing) before exiting through return end 101b of tube 101 to the common return conduit 94. In this way, fluid can flow continuously through all of the tubes 101 at the same time.

A second layer of tubing 102 is disposed on the side of the foam slab 26 nearest the panel floor 37 (ceiling side). Preferably, the tubing is disposed in contact with the panel floor 37 such as in the lower surface 228 of the foam slabs 26 between the foam and the covering mesh frames 32. Each tube 102 has its supply end 102a connected to a common supply conduit 96 and its other end 102b connected to the common return conduit 98. Water or other cooling or heating medium is supplied through common supply conduit 96 to each panel supply conduit 102 at its supply end 102a. The fluid flows through the panels 11, making at least two passes along the panel length (the number depends on the particular configuration of the tubing) before exiting through return end 102b of tube 102 to the common return conduit 98. In this way, fluid can flow continuously through all of the tubes 102 at the same time.

It will occur to those skilled in the art that having only one layer of tubing (either roof side or ceiling side) is a design choice and within the scope of the invention. Similarly, the rate at which fluid flows, the fluid used and the selection of tubes (ceiling and/or roof) to have operational are all choices made possible by the invention.

The hydronic tubes can provide thermal control in multiple ways. The roof side tubes 101 are used to help keep the interior cool and to provide a heat source that can be used in other ways. Cool water is run through the panels to siphon off solar gain. Solar radiation generates an enormous heat load (in many parts of the world during the summer) that would eventually make it into the interior of the building where it is unwanted. By siphoning off this heat, the interior of the building is kept cooler. Additionally, the heat generated on the roof can be taken to some place where its energy can be put to good use. For example, to a storage tank that can be used for hot water or as pre-heated water for use in a hot water system. It can be used as a heat source to heat the building in the winter. It can also be used to drive an absorptive chiller that uses the energy from the heated water to generate chilled water, thus replacing the need for or augmenting conventional air conditioning.

The ceiling side tubes 102 are used to "actively" affect the interior temperature of the building. If the combination of heat siphoning and the thermal mass and insulation of the roof system is insufficient to keep the building at the desired temperature, then the ceiling side hydronic tubing 102 is brought into play. Chilled water (with glycol) can be run through the ceiling plane tubes 102 to actively add cooling to the interior of the building on a hot summer day or night. Additionally, in the winter, the hydronic tubes 102 are filled with heated water (either from the roof tubes alone or augmented with a boiler) to heat the building. Note that this type of heating is considered the "Cadillac" of heating systems because it uses radiant energy to heat the bodies in the room without directly heating the air. It is preferred to radiant floor heating or forced-air heating. The ceiling plane is also relatively unobstructed (people typically don't put rugs on it or dining room tables over it) so that the area is maximized and the overall efficiency of the system is improved.

Most fires that start in buildings escape through the roof and most fires that enter buildings enter through the roof. Entry starts either by hot embers landing on the roof surface and migrating to the interior or, more violently, by flames reaching up the wall and eroding the underside of the overhang at the eaves and entering the building at the juncture between the wall and the roof. The present invention provides for a much-improved level of fire resistance over conventional roofs. The roof system of the present invention is constructed of concrete, which is the most fire-resistant modern construction material. Further, this highly fire-resistant material is positioned where it is needed most for fire protection—on the surface of the roof and at the eaves. The hydronic embodiment potentially provides an unprecedented level of fire resistance because water running through pipes will provide an unlimited fire resistance to both the ceiling and the roof surface. The fire rating wouldn't just be 20 min., 40 min., 1 hr., or 4 hrs., it would be "infinity." By connecting the switch for the circulating pump to the fire alarm system, water can be made to flow through the roof panels whenever a fire is present. This trigger would be independent of and override any other controls that sense the building's temperature or outside solar gain.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A generally rectangular construction panel comprising:
  a generally rectangular foam slab having a slab upper surface, a slab lower surface and slab lateral edges;
  a concrete panel bed covering said slab upper surface;
  a concrete panel floor covering said foam slab lower surface;
  construction panel concrete lateral edges extending from and integral with said concrete panel bed and said concrete panel floor;
  an upstanding concrete rail extending along and integral with each of the construction panel concrete lateral edges and extending above said panel bed so as to form a shallow U-shape with said panel bed wherein each said upstanding rail has a rail exterior sidewall and a rail top surface wherein said top surface is generally parallel to said panel bed;
  a plurality of spaced-apart shear key recesses formed at spaced apart locations in said rail exterior sidewall of each said rail wherein said key recesses are generally rectangular and extend from said rail top surface to above said panel bed whereby when two construction panels are placed side by side with their upstanding rails adjacent and their shear key recesses aligned, aligned shear key recesses form a shear pocket that is closed at its bottom and opened at the top surfaces of the side by side said upstanding concrete rails.

2. The construction panel of claim 1 further comprising:
  a first metal mesh frame material overlaying said upper surface of said foam slab in said concrete panel bed; and
  a second metal mesh frame material overlaying said lower surface of said foam slab in said concrete panel floor.

3. The construction panel of claim 1 further comprising:
  at least one hydronic tube disposed adjacent said foam slab within said concrete panel bed with its ends extending outside of said concrete panel bed.

4. The construction panel of claim 1 further comprising:
  at least one hydronic tube disposed adjacent said foam slab within said concrete panel floor with its ends extending outside of said concrete panel floor.

5. The construction panel of claim 1 further comprising a first hydronic tube disposed adjacent said foam slab within said concrete panel bed with its ends extending outside of said panel and a second hydronic tube disposed adjacent said foam slab within said concrete panel floor with its ends extending outside of said panel whereby said foam slab is between said first and second hydronic tubes.

6. A roof structure comprising;
  a plurality of construction panels according to claim 1 disposed side-by-side such that said exterior side wall of each upstanding rail of one construction panel is disposed next to and aligned with said exterior side wall of said upstanding rail of an adjacent construction panel wherein adjacent said shear key recesses form shear pockets; and
  cementious material in said shear pockets that form shear keys that resist relative lateral movement between adjacent construction panels due to shear forces on said construction panels.

7. The roof structure of claim 6 further comprising:
a fastener aperture in said shear key recess extending through said upstanding concrete rail wherein said fastener apertures of aligned shear key recesses are aligned; and
a mechanical fastener located in aligned fastener apertures securing adjacent upstanding concrete rails together.

8. The roof structure of claim 6 further comprising:
a weather cap disposed over adjacent said panel rails.

9. The roof structure of claim 6 further including a ridge beam brace and:
wherein said foam slab has end edges and said concrete panel bed covering said foam slab upper surface extends beyond said foam slab end edges and wherein said concrete panel floor covering said foam slab lower surface extends beyond said foam slab end edges; further comprising:
a concrete shear member extending from and integral with said panel bed and said panel floor at the location where said panel bed and said panel floor extend beyond said foam slab end edges wherein said shear members form construction panel end edges and whereby shear forces on said concrete panel bed and said concrete panel floor are resisted;
wherein said construction panels are disposed on and braced at both sides of the ridge beam and aligned such that one said end edge of each construction panel braced on the ridge beam is in facing relationship to said end edge of a construction panel on the other side of the ridge beam wherein the facing said end edges defining a keystone channel space between facing construction panels;
a cementious material in said keystone channel space forming a concrete channel keystone in the ridge beam channel space whereby the construction panels are supported by said keystone independently of the ridge beam.

10. The roof structure of claim 9 further comprising:
an anchor bolt embedded in and protruding from each said facing panel end edge and extending into said keystone channel space.

11. The roof structure of claim 9 further comprising:
a first hydronic tube disposed adjacent said foam slab within said bed and a second hydronic tube disposed adjacent said foam slab within said concrete panel floor with its ends extending outside of said concrete panel floor whereby said foam slab is between said first and second hydronic tubes.

12. The roof structure of claim 11 further comprising:
a superstructure disposed above and along said keystone;
a first pair of conduits within said superstructure disposed along the said keystone and connected to the ends of said first hydronic tube and a second pair of conduits within said superstructure disposed along said keystone connected to the ends of said second hydronic tubes.

* * * * *